Figure 1:
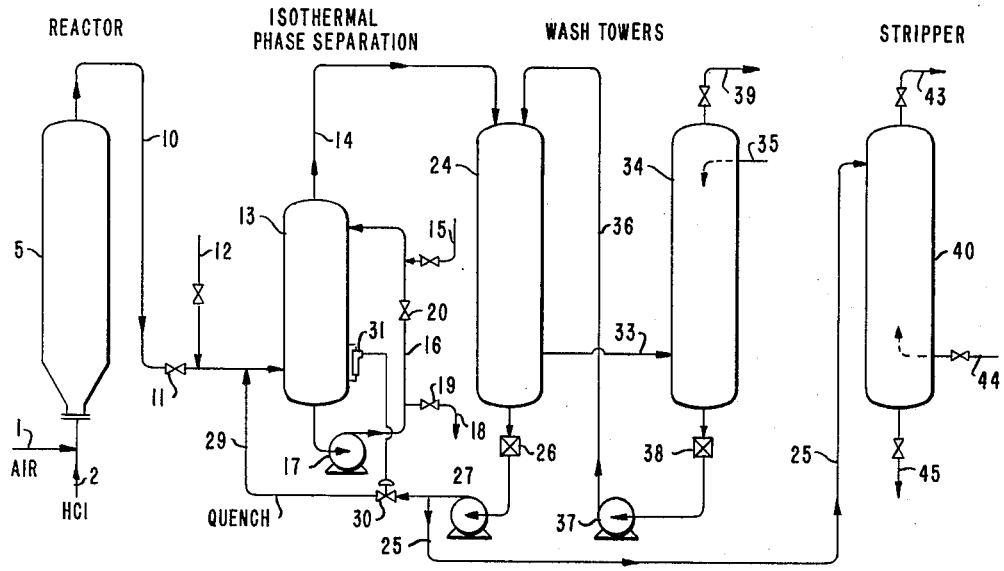
Figure 2:
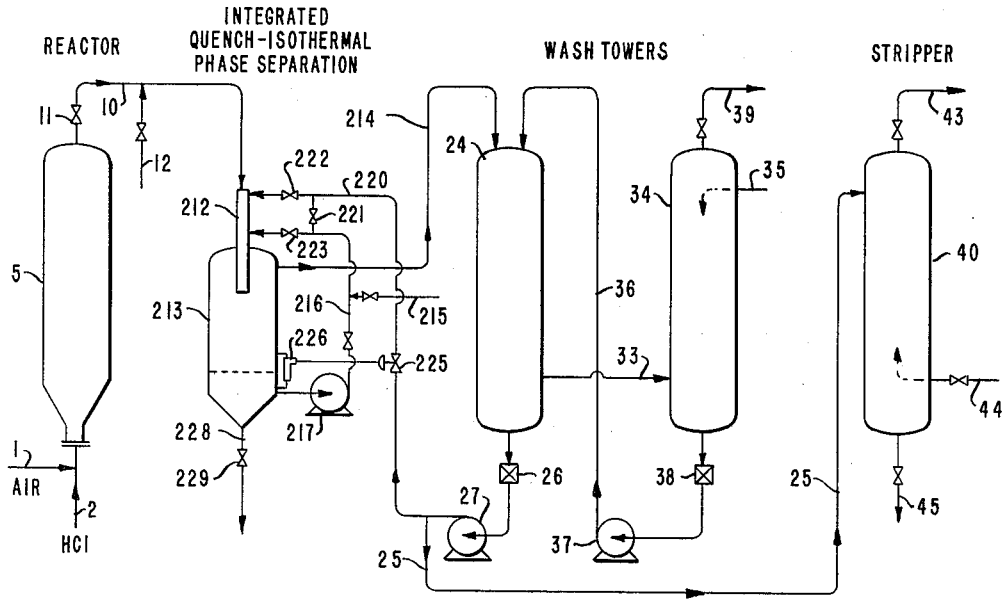

March 29, 1966     A. M. ALKEMADE ETAL     3,242,647

HYDROCHLORIC ACID RECOVERY

Filed April 4, 1963

INVENTORS:
ALPHONSUS M. ALKEMADE
JOHANNES H. DE GROOT
BY:
THEIR AGENT

United States Patent Office 3,242,647
Patented Mar. 29, 1966

3,242,647
HYDROCHLORIC ACID RECOVERY
Alphonsus M. Alkemade, The Hague, and Johannes H. de Groot, Amsterdam, Netherlands, assignors to Shell Oil Company, New York, N.Y., a corporation of Delaware
Filed Apr. 4, 1963, Ser. No. 270,662
Claims priority, application Netherlands, Apr. 19, 1962, 277,454
2 Claims. (Cl. 55—71)

This invention relates to an improvement in the recovery of hydrochloric acid from gaseous reaction products obtained at elevated temperatures containing hydrogen chloride in admixture with water vapor, normally gaseous materials and entrained normally solid impurities. The invention relates more particularly to the recovery of hydrogen chloride in a high state of purity from the hot reaction mixtures produced by reaction of hydrogen chloride with oxygen in the presence of a solid catalyst at elevated temperatures.

The process of the invention is applied broadly to the recovery of aqueous hydrogen chloride in a high state of purity from gaseous mixtures containing hydrogen chloride in admixture with normally gaseous materials, water vapor and entrained normally solid contaminants obtained at elevated temperatures. Essentially gaseous hydrogen chloride-containing mixtures of this type, contaminated by the presence of entrained normally solid materials, are obtained in the industry, often at elevated temperatures, as desired products or as byproduct streams, particularly in processes wherein chlorine and water vapor producing conditions are present. Normally solid contaminants encountered therein comprise, for example, entrained catalyst or components thereof, catalyst supports, metallic particles emanating from equipment, residual charge treating agents, and the like.

The invention is applied with advantage to the recovery of aqueous hydrogen chloride, free of any substantial amounts of entrained solids, from the impure, hot, gaseous reaction mixtures obtained in the production of chlorine by the reaction of hydrogen chloride with oxygen, or an oxygen-containing gas, in the presence of a suitable solid catalyst, for example a metal compound-containing catalyst such as a copper chloride-containing catalyst, which may additionally comprise finely divided, normally solid catalyst supports, such as clays, aluminous materials, silica gel, firebrick, and the like. This reaction is executed in the general temperature range of, for example, from about 300 to about 600° C. resulting in a gaseous reactor effluence, the temperature of which is in this range. The conversion is never complete, so the hot gaseous mixture issuing from the reactor invariably contains chlorine, water, hydrogen chloride and oxygen. If the starting materials are not pure hydrogen chloride and/or pure oxygen, the gas mixture will also contain other components. The oxygen-containing gas frequently used is, for example, air, in which case the gas mixture also contains nitrogen. Furthermore, starting materials used often comprise hydrogen chloride gas obtained as byproduct in the execution of other organic reactions, for example, the chlorination of propylene to allyl chloride, the cracking of dichloro-ethane to vinyl chloride, etc., and thus also contain organic contaminants. The gas mixtures derived therefrom then contain minor, but nevertheless significant, amounts of organic impurities consisting essentially of decomposition, oxidation and/or chlorination products of these organic contaminants, the specific composition of which will depend on the conditions under which the reaction was carried out.

In separating chlorine from such gas mixtures obtained by the catalytic oxidation of hydrogen chloride, the first step is to reduce its temperature to about 40° C.–100° C. This may be done by quenching with water and/or hydrochloric acid. The hot gas stream can be contacted with water, and/or hydrochloric acid, which evaporates at least partially and thereby removes heat from the gas stream. After quenching the gas mixture may be further worked up by various procedures. For example, the first step may be a separation of hydrogen chloride, for instance by washing the gas mixture with water and/or unsaturated hydrochloric acid (in which case a large portion of the water vapor present in the gas mixture will generally also condense), or by cooling the gas mixture to such an extent that at least a part of the water vapor present therein condenses and the hydrogen chloride gas is dissolved therein. The gas mixture can then be dried, if necessary, for instance, by contact with hydrochloric acid. Finally the chlorine may be recovered from the gas mixture, for example, by cooling and increasing the pressure, whereby the chlorine liquefies; or by washing the gas mixture with a selective solvent, such as carbon tetrachloride, in which the chlorine is readily soluble and the remaining gases poorly soluble, followed by distillation of the resultant solution in order to separate chlorine from solvent.

It follows from the above that when the gas mixture is worked up, its hydrogen chloride content is generally obtained as byproduct in the form of hydrochloric acid (aqueous hydrogen chloride). It is possible to be resigned to the fact that a portion of the hydrogen chloride charged to the chlorine-producing reaction remains unconverted, or else to attempt to convert it by recycling it to the reactor. The latter operation, however, is attended with considerable drawbacks owing to the fact that the unconverted hydrogen chloride is in the form of hydrochloric acid. If the hydrochloric acid is recycled to the reactor as such, a considerable amount of water is introduced therein, which has an unfavorable effect on the reaction equilibrium and causes an undesirable cooling of the reactor. The other possibility is first to separate hydrogen chloride from the hydrochloric acid and to recycle only the hydrogen chloride to the reactor, but this would require a separate and relatively costly installation for separating the hydrogen chloride gas from the hydrochloric acid.

Until recently no practical method was known for oxidizing hydrogen chloride gas to chlorine and water with a high degree of conversion. The best conversions obtainable were generally of the order of about 30–40%. Under these conditions it was the practice to recycle the unconverted hydrogen chloride to the reactor, despite the unavoidable drawbacks involved. The need for such relatively inefficient method of operation has, however, now been obviated. In copending U.S. patent application Serial No. 83,134, filed January 17. 1961, which matured into U.S. Patent 3,210,158, issued October 5, 1965, there is disclosed and claimed a novel process for the oxidative catalytic conversion of hydrogen chloride to chlorine with the aid of a catalyst enabling the execution of the reaction to proceed not only at substantially lower temperatures, but with attainment in practical scale operation of conversions corresponding substantially to the theoretical equilibrium value for the reaction. As is known, the theoretical equilibrium values become progressively more favorable with decreasing temperatures. Conversions of the order of about 75% are readily achieved in the process described and claimed in said copending application. Under these conditions it becomes more attractive not to recycle the unconverted hydrogen chloride to the reactor and to tolerate hydrochloric acid as a second desirable product of the process in addition to chlorine. Further practical advantages are inherent in such modified procedure, now made possible, for, as indicated above, starting materials for the oxidative conversion may comprise hydrogen chloride gas which contains organic contaminants. The contaminants are converted during the reaction into decomposition, oxidation and/or chlorination products, the specific nature of which will depend on conditions under which the reaction is carried out. Now it is precisely when the reaction is carried out at the desirable relatively low temperatures that the characteristics of these products obtained from the organic contaminants are such that they now can be separated from the reaction product far more readily than if the reaction were carried out at a higher temperature. As a result the hydrochloric acid obtained as byproduct in the catalytic oxidative conversion of hydrogen chloride to chlorine can, now, by the application of the present invention be recovered efficiently as a very pure and consequently very valuable product. This affords the possibility of converting the greater portion of practically worthless, impure hydrogen chloride gas into chlorine and the remainder into valuable, pure hydrochloric acid.

However, the preparation of pure hydrochloric acid as the second product of the process is attended with the following difficulty. The oxidation reaction producing the hydrochloric acid-containing gaseous mixture is carried out in the presence of solid catalysts. The catalysts employed for this reaction are metal salts, preferably a mixture of copper chloride, potassium chloride and didymium chloride supported on a carrier such as silica, as described and claimed in said copending application Serial No. 83,134. The hot gas mixture leaving the reactor entrains with it a contaminating amount of catalyst particles. This is particularly the case when the oxidative reaction is carried out with the aid of a fluidized bed of catalyst. In this case, although a cyclone is placed at the reactor outlet in order to separate the catalyst particles from the gas, complete separation is generally not achieved. When hydrogen chloride is recovered from the hot gaseous reaction mixture in the form of hydrochloric acid (aqueous hydrogen chloride) by methods disclosed heretofore, metal salts of the catalyst particles dissolve in the resultant hydrochloric acid, so that a hydrochloric acid product is generally obtained which is contaminated with metals or compounds thereof.

It is therefore an object of the present invention to provide an improved process enabling the more efficient recovery of aqueous hydrogen chloride from hot gaseous reaction mixtures comprising hydrogen chloride in admixture with water vapor, normally gaseous materials and entrained normally solid materials.

A specific object of the invention is the provision of an improved process enabling the more efficient recovery of hydrochloric acid in a high state of purity from hot gaseous mixtures produced by catalytic oxidative conversion of hydrogen chloride and containing hydrogen chloride in admixture with chlorine, water vapor, fixed gas and entrained normally solid materials.

In accordance with the present invention aqueous hydrogen chloride is recovered in a high state of purity from hot, gaseous mixtures containing hydrogen chloride in admixture with chlorine, water vapor, fixed gas and entrained normally solid material, by controlled quenching of said hot gaseous mixtures with water or aqueous hydrogen chloride to result in a quenched mixture which is at its dew point temperature, contacting said quenched mixture while at its dew point with aqueous hydrogen chloride, the temperature and partial pressures of hydrogen chloride and water vapor of which are substantially the same as those of the isothermally quenched mixture in a phase separating zone, thereby isothermally separating a liquid phase comprising aqueous hydrogen chloride and said normally solid material from a gaseous phase comprising hydrogen chloride, chlorine, water vapor and fixed gas free of any substantial amount of said normally solid material in said phase separating zone, and separating aqueous hydrogen chloride free of any substantial amount of said solid material from said gaseous phase separated in said phase separating zone.

In order to set forth more fully the nature of the invention it will be described hereinafter in detail with reference to the attached drawing, wherein FIGURES I and II each represent more or less diagrammatically an elevational view of a form of apparatus suitable for carrying out the process of the invention; the apparatus of FIGURE II being characterized by the incorporation therein of integrated quenching-isothermal phase separating zones wherein the scrubbing medium, as well as the quenching medium, is introduced into the quenching zone.

*Example I*

Referring to FIGURE I of the attached drawing: hydrogen chloride gas, containing organic impurities, emanating from an outside source through line 2, is combined with air, introduced through line 1, and the mixture subjected to oxidative conversion conditions in a suitable reaction zone to effect the oxidative conversion of hydrogen chloride to chlorine. Suitable oxidative reaction conditions comprise those described and claimed in copending U.S. application Serial No. 83,134 above referred to including, for example, the presence of a catalyst consisting essentially of a mixture of copper chloride-potassium chloride-didymium chloride and a suitable solid support, such as finely divided silica, and a temperature in the range of about 300–400° C. Although the use of such reaction conditions are preferred as the source of the hydrogen chloride-containing gaseous mixture treated in accordance with the invention, it is to be understood that the invention is not necessarily limited with respect to the specific reaction conditions employed in the production of the gaseous mixture subjected to the process of the invention, and any conditions producing the suitable gaseous hydrogen chloride containing charge may suitably be employed in reaction zone 5.

Reactor effluence, comprising unconverted hydrogen chloride in admixture with water vapor, chlorine, fixed gases including oxygen, nitrogen, oxides of carbon, as well as organic impurities and entrained catalyst, is passed from reactor 5 through line 10, provided with valve 11, into a suitable phase separating zone. The phase separating zone may comprise a zone of enlarged cross-sectional area such as, for example, a chamber 13. A valved line 12, discharging into line 10, is provided for the introduction of suitable hot hydrogen chloride-containing gas, of the type described herein as suitable for treatment in accordance with the invention, into the system from any suitable outside source. Such gaseous mixture introduced through valved line 12, may constitute a part or all of the gaseous mixture charged through line 10 into chamber 13. Thus in a typical operation, a gaseous stream of 5229.7 kg./hour, obtained by the catalytic oxidative conversion of hydrogen chloride-containing organic impurities with air in reactor 5, and discharged therefrom into line 10, is found to have the following composition in parts by weight:

| | |
|---|---:|
| HCl | 658.9 |
| $H_2O$ | 519.3 |
| $C_2Cl_6$ | 47.4 |
| $O_2$ | 109.7 |
| $N_2$ | 1952.2 |
| $CO_2$ | 35.2 |
| $Cl_2$ | 1897.8 |
| $CCl_4$ | 9.2 |
| | 5229.7 |

In addition thereto the gaseous mixture contains entrained catalyst and catalyst support in varying amounts ranging, for example, up to about 0.05% by weight based on chlorine content of reactor effluence.

In passing through line 10 the gaseous mixture is quenched to the dew point of the resulting quenched mixture by introduction of cool aqueous hydrogen chloride emanating from within the system, through valved line 29 discharging into line 10. Thus the gaseous mixture flowing through line 10 is cooled from 365° C. to 95° C. by quenching with 574.8 kg./hour of hydrochloric acid of 30.5% concentration (175.3 HCl+399.5 H$_2$O) of 40° C. supplied through line 29; the hydrochloric acid so added as quench being totally evaporated. Hence the gaseous mixture entering chamber 13 now contains 834.2 kg./hour of HCl and 918.8 kg./hour of H$_2$O and its composition is unaltered as regards the other components so that the total gas stream is now 5804.5 kg./hour plus the entrained solids. This gas stream is passed into the lower part of chamber 13 which it leaves at the upper part thereof through line 14, its temperature being substantially unchanged. In chamber 13 the gaseous mixture is contacted with a scrubbing medium consisting essentially of aqueous hydrogen chloride having the same partial pressure of hydrogen chloride and water vapor and the same temperature as the quenched gaseous mixture entering chamber 13 through line 10. The temperature within chamber 13 is kept constant at substantially the dew point of the entering quenched stream (95° C.). A liquid phase, substantially equal in quantity to that entering as scrubbing medium, will separate isothermally in chamber 13 from a vapor phase. The effect will be a scrubbing of the gaseous mixture within chamber 13 with entrainment and/or solution of substantially all normally solid materials, such as metals, catalyst support, etc., entering chamber 13, in the liquid phase. The gaseous phase separated in the chamber 13 will be free of any substantial amount of normally solid components. The liquid phase separating in the lower part of chamber 13, consisting essentially of aqueous hydrogen chloride containing dissolved or suspended therein all metal or normally solid components entering chamber 13, is withdrawn therefrom by means of line 16, provided with pump 17, and valve 20. Liquid phase so withdrawn is circulated through line 16 to the upper part of chamber 13, and introduced therein while at the temperature prevailing in chamber 13. Thus in the instant illustrative operation the liquid phase withdrawn from chamber 13 consists essentially of hydrochloric acid, of 24.8% concentration, at a temperature of 95° C., which is recycled through line 16 to the upper part of chamber 20 at the rate of 7000 kg./hour. A portion of the liquid phase is continuously or intermittently withdrawn from line 16, through line 18, provided with valve 19, to avoid build-up of separated normally solid catalyst and/or dissolved metals and organic impurities therein. The liquid scrubbing medium so withdrawn is replaced. Although it is preferred to employ as scrubbing medium the aqueous hydrochloric acid phase withdrawn from chamber 13, a part or all of such suitable scrubbing medium may emanate from another part of the system or from an external source through valved line 15. The amount of liquid withdrawn through valved line 18 will then be substantially equal to that introduced through line 15.

Gaseous phase, comprising hydrogen chloride, chlorine, water vapor, oxygen and nitrogen, now free of any substantial amount of entrained normally solid materials, is withdrawn from chamber 13, through line 14 and passed to a suitable product recovery zone, comprising, for example, a suitable wash tower 24. Within wash tower 24, the gaseous stream, entertaining at the upper part thereof, is brought into cocurrent contact with a suitable washing medium, such as a dilute aqueous hydrochloric acid, for example, of 13% concentration, introduced through line 36 into the top of column 24. Hydrogen chloride will be absorbed by the relatively dilute acid washing medium in column 24 with the formation of a liquid phase consisting of relatively concentrated hydrochloric acid (e.g., 30.5% concentration) and a gaseous phase comprising chlorine, hydrogen chloride, oxygen and nitrogen. The gaseous phase is withdrawn from wash tower 24 at an intermediate part thereof through line 33 discharging into the lower part of a second wash column 34, wherein it is washed countercurrently with water introduced into the upper part of tower 34 by means of line 35. Within tower 34, hydrogen chloride is dissolved in the aqueous stream; and water vapor entering as a component of the stream entering through line 33 is condensed. There thus is separated a liquid phase consisting essentially of hydrochloric acid of 13% concentration and a gaseous phase comprising chlorine, oxygen and nitrogen and containing no substantial amount of hydrogen chloride, in wash tower 34. The gaseous phase is withdrawn from the upper part of tower 34 through line 39 and passed to suitable chlorine separating means. The liquid phase is withdrawn from the bottom of tower 34 and passed through line 36, to the upper part of the first wash tower, 24, to be used as the dilute acid washing medium therein.

Liquid phase, consisting essentially of hydrochloric acid of 30.5% concentration, is withdrawn from first wash tower 24, through lines 29 and 25, provided with pump 27, and introduced into a stripping column 40 wherein it is stripped with a stream of air entering through valved line 44 to remove any residual amounts of chlorine therefrom. Gas consisting essentially of air and chlorine leaves the upper part of stripper 40 through valved line 13. Liquid phase consisting of hydrochloric acid of high purity containing no detectable amount of normally solid materials and free of dissolved metals, and organic impurities is withdrawn as a final product from the lower part of stripper 40, through valved line 45.

A controlled amount of the hydrochloric acid (30.5% concentration) flowing through line 29 is passed as quench to line 10.

Filters 26 and 38 are provided in lines 25 and 36, respectively, to filter out organic contaminants which have crystallized in the system. Organic contaminants entering chamber 13 are thus substantially completely removed from the system in the streams withdrawn through lines 18, 39 and 43 and filters 26 and 38, to result in a hydrochloric acid product in line 45 substantially free of organic contaminants.

It is seen that in accordance with the invention quenching of the hot hydrogen chloride-containing gas is controlled so as to obtain a quenched mixture which is at the dew point temperature. It is only when the temperature of the quenched gas mixture flowing into the phase separator 13 is at the dewpoint that the gaseous stream leaves the phase separator 13 with substantially unchanged composition. To this end it is also necessary that the scrubbing medium used in the phase separator 13 should be of such a concentration that at the temperature prevailing the vapor pressures of water vapor and hydrogen chloride gas above the hydrochloric acid are just equal to the partial pressures of water vapor and hydrogen chloride gas in the quenched gas mixture to be washed in chamber 13. The temperatures of the gas mixture to be washed in chamber 13 and that of the scrubbing medium should also be the same.

The temperature and the composition at which the gaseous mixture is received from the oxidation reactor will generally be subject to little change. But by controlling the amount and composition of the quenching liquid it is possible to control both the temperature and the composition of the gaseous mixture flowing into and out of chamber 13 (and hence also to influence the partial pressures of hydrogen chloride and water vapor in said gaseous mixtures). Moreover the composition of the scrubbing medium in the chamber 13 is also a variable capable of being controlled. After several variables have been adjusted and the system has been started up, deviation from the state of equilibrium is easily corrected. Such deviation may occur in practice as a result or fluctuations in operating conditions of the oxidative-conversion reactor, resulting in some fluctuations in temperature and composition of the gas mixture leaving the reactor. Correction of deviation from the state of equilibrium is illustrated in greater detail hereinbelow with reference to Example II and the FIGURE II of the attached drawing.

The following Example II illustrates the execution of the invention with the aid of integrated quenching and phase-separating zones enabling introduction of both quenching and scrubbing media in a single zone while maintaining isothermal phase-separating conditions in the phase-separating zone.

*Example II*

Parts of apparatus of FIGURE I and FIGURE II which are identical are identified by like reference characters.

The effluence from reactor 5, having the composition shown above in Example I, is passed at the rate of 5229.7 kg./hours, at 365° C., into the quenching zone of an integrated quenching-phase separating system. The suitable integrated quenching-phase separating zones may comprise an elongated quenching zone of restricted cross-sectional area in direct open communication with a phase separating zone of enlarged cross-sectional area. Thus the quenching zone may comprise a tubular vessel 212, projecting into a chamber 213. The tubular vessel may comprise suitable means enabling the mixing of vapors and liquids charged thereto, such as, for example, baffles, packing, trays, etc. The vessel 212 is, however, preferably provided with means enabling intensive mixing of materials introduced therein such as, for example, venturi tubes, injector nozzles or mixers, and the like.

Within vessel 212 the reactor effluence is contacted with the controlled amount of cool quenching medium, e.g., water or hydrochloric acid, to result in a quenched mixture which is at the temperature corresponding to the dew point for the admixture of quenching medium and said gaseous stream. Thus, in the specific illustrative operation the 574.8 kg./hour of 30.5% hydrochloric acid, at 40° C., emanating from wash tower 24, through line 220, is introduced into tubular vessel 212 as quenching medium, resulting in a quenched stream having the temperature of 95° C. Liquid phase consisting essentially of hydrochloric acid of 24.8% concentration, at 95° C., is cycled from the lower part of chamber 213, by means of valved line 216, provided with pump 217, and valve 223, into tubular vessel 212, at the rate of 7000 kg./hour. A combined total of 7574.8 kg./hour of liquid is thus introduced via lines 216 and 220 into vessel 212. Within vessel 212 simultaneous quenching and washing takes place. The effluence from vessel 212 discharges into chamber 213, the temperature in which is maintained substantially constant at the temperature corresponding to the dew point temperature of the admixed gaseous reactor effluence and quenching medium (determined in the absence of the liquid scrubbing medium). The net result therefore is that an amount of HCl and water substantially equal to the amount introduced into vessel 212, through line 220, as hydrochloric acid of 30.5% concentration is vaporized upon mixing with the hot gaseous mixture so that the gaseous mixture flowing from vessel 212 into chamber 213, and from 213 through line 214 into first wash tower 24, has substantially the same composition as the gas mixture flowing through the line 14 of the FIGURE I of the foregoing Example I. Consequently in vessel 212 the amount of HCl and water remaining in liquid phase equals 7000 kg./hour of hydrochloric acid of 24.8% concentration. The liquid phase is separated isothermally in phase separator 213 from the effluence from vessel 212. This liquid phase being recycled at the rate of 7000 kg./hr. through line 216 to vessel 212, it is apparent that the liquid level in chamber 213 will remain substantially constant.

During the combined quenching-scrubbing operation in vessel 213 all normally solid impurities are incorporated into, and all soluble metal and organic components are dissolved in, the liquid hydrochloric phase of the mixture which is separated isothermally in chamber 213. Buildup of impurities in the liquid phase in chamber 213 and line 216 is avoided by continuous or intermittent withdrawal of a portion thereof through line 228 provided with valved line 229.

The gaseous phase leaving chamber 213 through line 214 will be free of any substantial amount of normally solid impurities. It is sent through line 214 into the first wash tower 24 and worked up substantially as described in the foregoing Example I. The unconverted hydrogen chloride content of the hot gaseous reactor effluence is thus recovered as essentially pure hydrochloric acid of 30.5% concentration leaving stripper 40 through valved line 45.

Although quenching medium and scrubbing medium have been shown entering vessel 212 at separate inlets thereto via lines 216 and 220 respectively, these streams may be combined in part or entirely prior to their introduction into the vessel 212. Thus a valved line 221 is provided enabling the combining of all or a part of the streams in lines 216 and 220, by control of valves 222 and 223, before their entry into vessel 212. Care is, however, taken to maintain the relative conditions of temperature and quantity defined hereinabove with respect to the addition of quench and scrubbing media to the hot gaseous mixture.

A line 215, corresponding to line 15 in FIGURE I, enables replenishing the scrubbing media from an outside source or another point within the system should this be desired.

A suitable method of control with regard to maintaining optimum conditions within the isothermal phase-separating zone and related quenching zone consists of correlating the liquid level within chamber 213 with the quantity of quenching medium flowing through line 220. To this effect, a liquid level control 226 on chamber 213 controls the amount of quench passing through line 220 by actuating valve 225. The temperature and concentration of the washing liquid will then adjust themselves automatically to the proper values. As an example may be taken the case in which the water content of the hot gaseous mixture arriving through line 10 is slightly increased. The partial pressure of the water vapor in the quenched gas mixture then becomes slightly higher than the water vapor pressure above the liquid phase consisting of hydrochloric acid of 24.8% concentration in chamber 213. As a result water is precipitated in the chamber 213 and the liquid level therein rises. This is then compensated for by a slight automatic reduction of the supply of quenching liquid flowing through the line 220. The temperature in the vessel 213 then rises, as a result of which evaporation rate increases and the liquid level in chamber 213 again falls to the normal value. The amount of quenching liquid passed through line 220 is then again automatically restored to the normal value.

It will be clear that the system described in Example I and FIGURE I can be controlled in a similar manner. To this effect a liquid level control 31, on chamber 13, actuates the valve 30, controlling the flow of quench to line 10 through line 29.

Parts of apparatus, such as pumps, valves, storage vessels, etc. not essential to a complete understanding of the invention have been omitted from the drawing and the detailed description for the sake of simplicity. It is to be understood that conventional means may be resorted to to obtain and maintain the conditions of temperature prescribed herein for the various phases of the process.

We claim as our invention:

1. The process for recovering aqueous hydrogen chloride from hot gaseous mixtures containing said hydrogen chloride in admixture with chlorine, water vapor, oxygen, inert gas and normally solid impurities which consists essentially of introducing said hot gaseous mixture into an elongated quenching zone of restricted cross-sectional area in open communication with a phase-separating zone of enlarged cross-sectional area, introducing quenching medium consisting essentially of hydrochloric acid in controlled amount into said quenching zone, to cool said hot gaseous mixture to the temperature corresponding substantially to the dew point temperature of the resulting admixture of said hot gaseous mixture and said quenching medium, additionally introducing liquid scrubbing medium emanating from within the system at said dew point temperature into said quenching zone, passing the total effluence from said quenching zone into said phase-separating zone, maintaining the temperature in said phase-separating zone substantially constant at said dew point temperature, thereby effecting isothermal separation of a liquid phase comprising aqueous hydrogen chloride and normally solid impurities from a vapor phase comprising hydrogen chloride, water vapor, oxygen and inert gas and chlorine, now free of any substantial amount of normally solid impurities, separately withdrawing said liquid and vapor phases from said phase-separating zone, employing said liquid phase withdrawn from said phase-separating zone as said liquid scrubbing medium emanating from within the system introduced into said quenching zone, contacting said vapor phase withdrawn from said phase-separating zone with aqueous hydrogen chloride in a separate washing zone, separating a liquid phase consisting essentially of aqueous hydrogen chloride from a vapor phase consisting essentially of hydrogen chloride and water vapor and chlorine in said washing zone, and passing a part of said liquid phase separated in said washing zone to said quenching zone.

2. The process in accordance with claim 1 wherein the rate of passage of said liquid phase from said washing zone to said quenching zone is controlled to maintain a constant low liquid level in said phase-separating zone.

References Cited by the Examiner

UNITED STATES PATENTS

| 1,327,536 | 1/1920 | Elliott | 23—154 X |
| 2,644,846 | 7/1953 | Johnson et al. | |
| 2,730,194 | 1/1956 | Wohlers et al. | 55—71 X |
| 2,909,240 | 10/1959 | Colton | 55—71 |
| 2,929,682 | 3/1960 | Clark | 23—154 X |
| 3,049,417 | 8/1962 | Bradley et al. | 23—154 X |
| 3,054,831 | 9/1962 | Samples et al. | |
| 3,073,092 | 1/1963 | Ancrum et al. | 55—71 |
| 3,079,231 | 2/1963 | Draper et al. | 23—154 |
| 3,085,117 | 4/1963 | Brown et al. | 260—654 |
| 3,085,860 | 4/1963 | Jacobowsky et al. | 23—155 |
| 3,113,972 | 12/1963 | Kodama et al. | |
| 3,120,568 | 2/1964 | Brown | 260—654 |
| 3,131,028 | 4/1964 | Stow | 23—219 |
| 3,165,453 | 1/1965 | Sutter | 23—154 |

SAMIH N. ZAHARNA, *Primary Examiner.*

REUBEN FRIEDMAN, *Examiner.*

B. NOZICK, *Assistant Examiner.*